United States Patent
Genequand

(10) Patent No.: US 6,283,666 B1
(45) Date of Patent: Sep. 4, 2001

(54) PLANAR FLEXIBLE PIVOT MONOLITHIC UNITARY MODULES

(75) Inventor: Pierre-Marcel Genequand, Geneva (CH)

(73) Assignee: Csem Centre Suissee d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 08/949,686

(22) Filed: Oct. 14, 1997

(30) Foreign Application Priority Data

Oct. 11, 1996 (FR) .................................................. 96 12456

(51) Int. Cl.⁷ ...................................................... F16C 11/12
(52) U.S. Cl. ............................ 403/119; 403/220; 439/67; 439/492
(58) Field of Search .................................. 464/87; 439/67, 439/492, 493, 499; 428/134; 403/119, 220, 341

(56) References Cited

U.S. PATENT DOCUMENTS

| 2,793,028 | 5/1957 | Wheeler . | |
|---|---|---|---|
| 2,920,498 | 1/1960 | Federn . | |
| 3,405,539 | 10/1968 | Tanaka . | |
| 3,628,781 | * 12/1971 | Grib | ................. 403/220 X |
| 3,957,316 | * 5/1976 | Armitage | ........................ 403/220 X |
| 4,919,993 | 4/1990 | Woodruff . | |
| 5,315,890 | * 5/1994 | Long | ................................ 403/220 X |
| 5,655,285 | * 8/1997 | Bonn et al. | ........................ 439/67 X |

FOREIGN PATENT DOCUMENTS

| 452 286 | 8/1965 | (DE) . |
| 32 41 373 | 5/1984 | (DE) . |
| 0 015 353 | 9/1980 | (EP) . |
| 0 275 338 | 7/1988 | (EP) . |

* cited by examiner

Primary Examiner—Lynne H. Browne
Assistant Examiner—John R. Cottingham
(74) Attorney, Agent, or Firm—Connolly Bove Lodge & Hutz LLP

(57) ABSTRACT

The planar flexible pivot is constituted by an axial stacking of unitary modules each forming a monolithic unit comprising two coplanar, rigid linking elements positioned substantially so as to face each other and being connected diagonally by an essentially rectilinear flexible band. Application to elastic hinges, especially cross-band pivots.

16 Claims, 7 Drawing Sheets

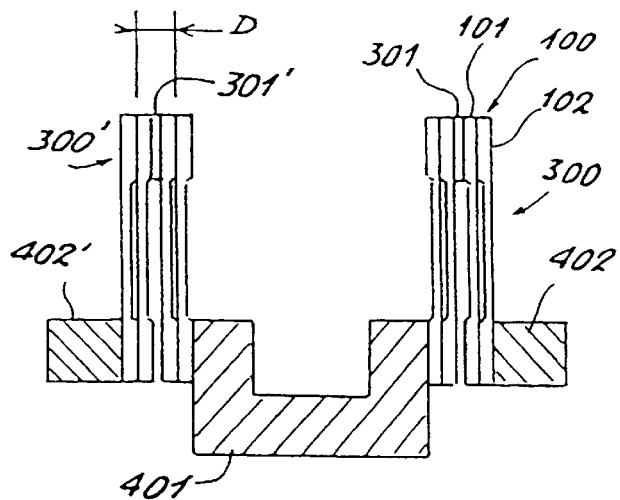
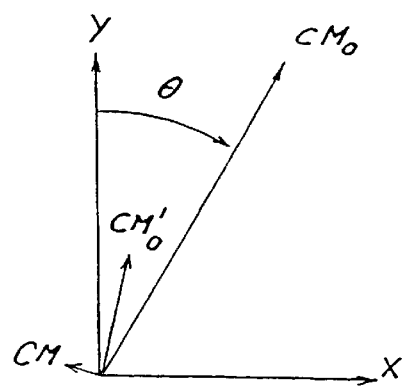
FIG. 5a  FIG. 5b
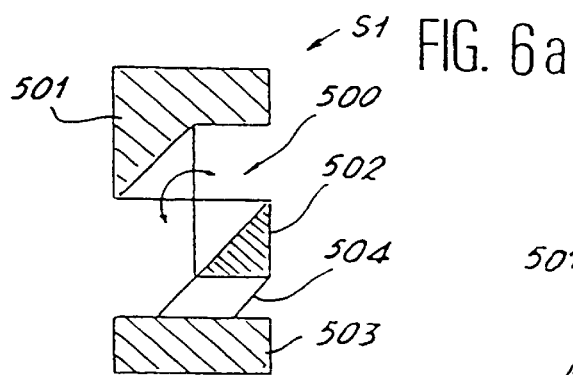
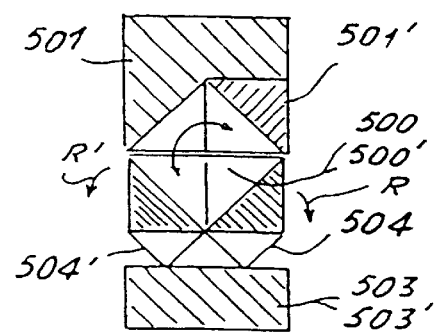
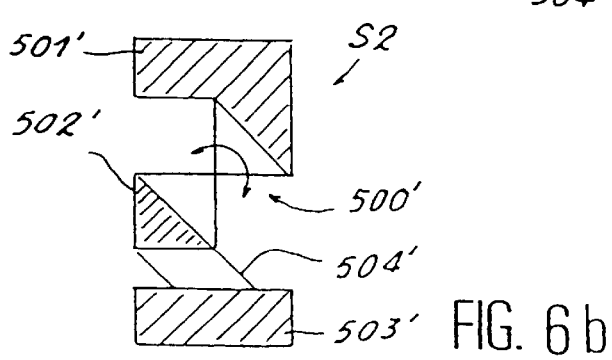
FIG. 6a  FIG. 6b  FIG. 6c

PLANAR FLEXIBLE PIVOT MONOLITHIC UNITARY MODULES

BACKGROUND OF THE INVENTION

1. Field of the Invention

The present invention relates to a unitary module for a planar flexible pivot as well as to a planar flexible pivot formed by a stack of unitary modules. It relates especially to a method for the manufacture of said unitary module and to assemblies and applications of said planar flexible pivots.

The invention can be applied to special advantage in the field of elastic joints, especially cross-band pivots.

2. Description of the Prior Art

The technology of elastic joints conventionally teaches that, for systems of guidance with low amplitude of displacement, it is advantageous to use a thin and elongated spring band (hereinafter called a band) that is embedded at one end and subjected to forces at the other end, with the property of easily lending itself to a flexing motion in the direction perpendicular to the band while at the same time remaining rigid in the parallel directions.

When the strains are calculated so that they remain well within the elastic limits and the buckling loads, a perfectly precise and reproducible device is obtained, free from play, friction or wear and tear, and with no phenomena of jamming. The reproducibility is limited only by the residual hysteresis applied to the non-compensated effects due to the variation of the loads and the finite rigidity of the bands. It must also be added that no lubrication is necessary.

Within the limits of static deflection mentioned, elastic joints thus have major advantages over conventional kinematic joints such as blocks, slides, bearings, etc. The permitted load limits are all the higher as the deflection required is low and as the thickness of the elastic joints may be great.

The principle of a one-band flexible pivot is shown in FIG. 1 which gives a side view of a flexible band 10 with a length L, one end 10a of which is embedded. When a torque T is applied to the free end 10b of the band 10, this band gets curved and said free end 10b shifts in pivoting roughly about the axis passing through the center 11 of the band 10 at rest, thus defining a flexible-band pivot.

However, a one-band pivot is not stable under the action of a load perpendicular to the plane of the band. To overcome with this drawback, the cross-band pivot has been designed. An example of such a pivot is shown in the view in perspective of FIG. 2. In this example, the two bands 10, 20 are crossed at right angles, their ends being fixed by screws to supports 1, 2.

In order to make the flexible cross-band pivot less sensitive to the effect of off-plane loads, it is possible to use two pairs of crossed bands located symmetrically at a certain axial distance from each other. Thus, a great traversal rigidity and high resistance to unwanted action is obtained. Furthermore, the instantaneous center of rotation is practically fixed up to pivoting angles of 10°.

It has also been sought to compensate for the elastic reaction of rotation of the flexible-band pivots-by subjecting the bands to a traction force, the elastic energy being exchanged between the bands and draw springs. Among the pivots of this type, there is a known device with three bands positioned at 120° which furthermore has the advantage of enabling, in principle, a rotation about an invariable axis as a function of the pivoting deflection.

However, the known cross-band flexible pivots have a certain number of drawbacks.

Indeed, all the pivots mentioned here above are based on the concept of distinct separate bands that have to be screwed in, bonded or soldered to supports. In every case, the band/support joining area is subjected to a set of stresses due to the combined effects of the rotational deflection of the bands, the external load, especially the axial load, and internal hyperstatic stresses (membrane effects) acting on the pivot. This state of mechanical stress is a major factor in the loosening or disconnecting of assemblies and may lead to the breakage of the soldered parts through cyclical fatigue.

Furthermore, the position of the pivoting axis varies with the rotation, which corresponds to the lack of balance of the pivot. In addition to the systematic variation provided for by theory, it is also possible to observe variations that are reversible in varying degrees and random due to the effects of membrane hyperstaticity. This last-mentioned form of behaviour also depends on clamping strains when the pivot-fastening supports are cylindrical.

Finally, it is difficult to achieve the automation of the assembly process as also the miniaturization of the separate-band pivots. This makes the cost of the small-sized pivots comparatively high.

SUMMARY OF THE INVENTION

Thus, an aim of the present invention is to propose a flexible-band pivot that would make it possible to simplify and automate the assembling operations, attenuate the effects of stresses in the supports and enable the miniaturization of the parts.

To this end, the invention provides for the making of a planar type band pivot out of unitary modules that can be stacked. This is why the present invention proposes a unitary module for a planar flexible pivot wherein said module forms a monolithic unit comprising two coplanar rigid linking elements positioned substantially so as to be facing each other and connected diagonally by an essentially rectilinear flexible band.

According to the invention, there is provided a planar flexible pivot consisting of an axial stack of unitary modules wherein said unitary modules are assembled by their respective linking elements. Each assembly of linking elements forms an interfacing of the pivot with an external component. Preferably, the assembly of linking elements is further stacked on a planar area of the external element.

According to an embodiment of the planar flexible pivot of the invention, the unitary modules are assembled so that the flexible band of a unitary module is crossed with the flexible band of a neighboring unitary module. In particular, said flexible bands are crossed at right angles.

In order to prevent the concentration of high stresses and their transmission to the linking elements, it is planned according to the invention that, for each module, said flexible band will have at each end a transition area with a gradually variable section forming a junction between the band and each linking element.

For the efficient functioning of the planar flexible pivot that is the object of the invention, the cross bands of two neighboring modules will preferably not touch each other after stacking. To this end, it is provided in the invention that said flexible band will have a thickness-reducing area between the two linking elements. An alternative approach would use thickness shims.

As already mentioned here above, the pivoting axis of the structures that are hinged on cross bands shifts during rotation. This leads to effects of unbalance. The planar flexible pivots according to the invention provide possibilities of making assemblies with means of compensating for the effects of unbalance.

Two different assemblies which shall be described in detail further below are proposed by the invention e to obtain this effect of compensation.

According to the invention, a first assembly, known as a series compensation assembly, has an internal interface connected at each end to an external interface by means of a set of planar flexible pivots with two cross-band unitary modules arranged in series.

A second assembly, known as a parallel compensation assembly, comprises, on the one hand, a first planar structure of at least one planar flexible pivot with two cross-band unitary modules, of which first linking elements form a first rigid interface and of which second linking elements form an intermediate recoil interface that is connected to a second rigid interface by an elastic parallelogram orthogonal to the pivot and, on the other hand, a second planar structure, identical to the first planar structure, said first and second planar structures being superimposed in parallel in a back-to-front position and being assembled by their first and second respective rigid interfaces, said intermediate recoil interfaces being unattached.

Owing to their planeity, their stacking modularity and their limited axial space requirement, the planar flexible pivots of the invention may be integrated in a great many combinations in the mechanical assemblies.

Their relatively low axial rigidity is not necessarily a drawback. This property enables the attenuation, and even the elimination, of the phenomena of hyperstatic membrane instability. It also makes it possible to tolerate sufficient strains for the implementation of axial links such as safety stops, which is difficult with the known prior art pivots.

In order to stabilize the pivoting mechanical link under off-plane forces, the planar flexible pivots according to the invention should generally be mounted two by two, at a certain axial distance from each other.

It is in order to obtain this basic configuration that there is proposed an application of the flexible planar pivot of the invention for making a universal pivoting link assembly, wherein a central interface that can be fitted into an external interface is mounted in a pivoting position by means of at least one planar flexible pivot with two cross-band unitary modules whose linking elements are fixed respectively to the central interface and to the external interface.

The universal pivoting link assembly may in turn be implemented in many applications that shall be explained further below, such as a cardan assembly, a contact stop pivoting link or a torsion rod pivoting link.

BRIEF DESCRIPTION OF THE DRAWINGS

The following description made with reference to the appended drawings, given by way of non-restrictive examples shall provide a clearer understanding of the content of the invention and the way in which it can be obtained.

FIG. 3b is a front view of the pivot of FIG. 3a;

FIG. 5a is a side view of an assembly of planar pivots wit series compensation for lack of balance;

FIG. 5b is a graph showing the effect of compensation for lack of balance of the assembly of FIG. 5a;

FIG. 6a is a front view of a first structure of an assembly of planar pivots with parallel compensation for lack of balance;

FIG. 6b is a front view of a second structure of an assembly of planar pivots with parallel compensation for lack of balance;

FIG. 6c is a front view of the assembly of planar pivots with compensation for lack of balance achieved by the stacking of the structures of FIGS. 6a and 6b;

FIG. 8b is a front view of the pivoting link of FIG. 8a;

FIG. 9b is a front view of the pivoting link of FIG. 9a;

DETAILED DESCRIPTION OF THE INVENTION

Figure 1:
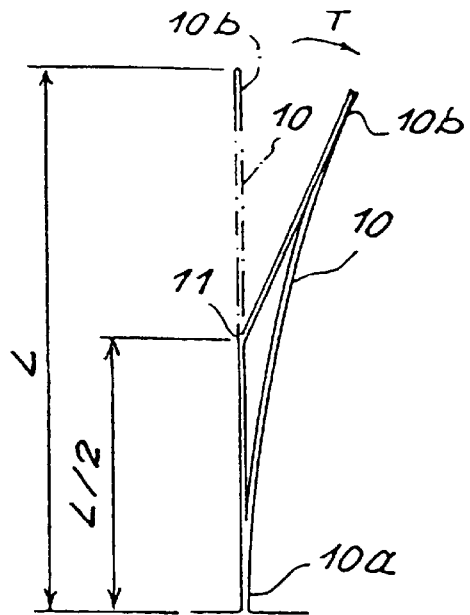
FIG. 1 is a side elevational view of a prior art single band pivot.
Figure 2:
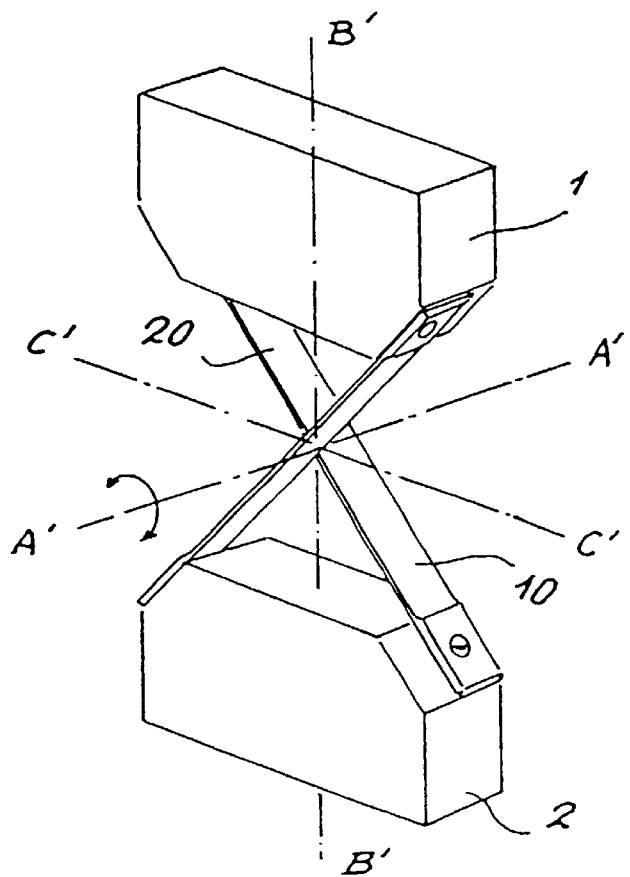
FIG. 2 is a perspective view of a prior art cross band pivot.
Figure 3A:
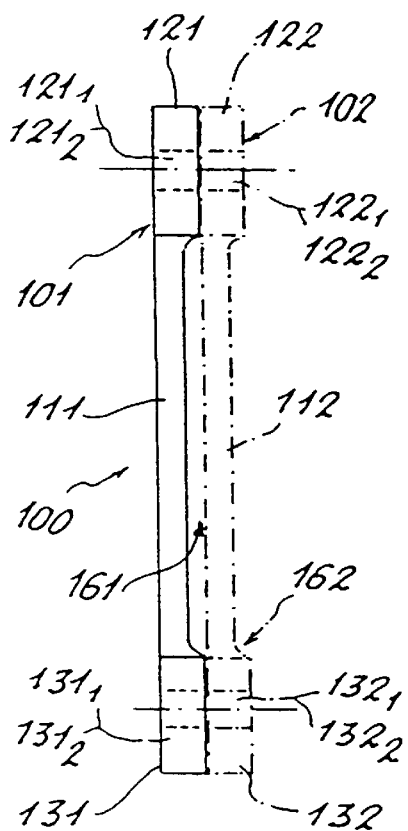
FIG. 3a is a side view of a planar flexible pivot with two unitary modules according to the invention.
Figure 3B:
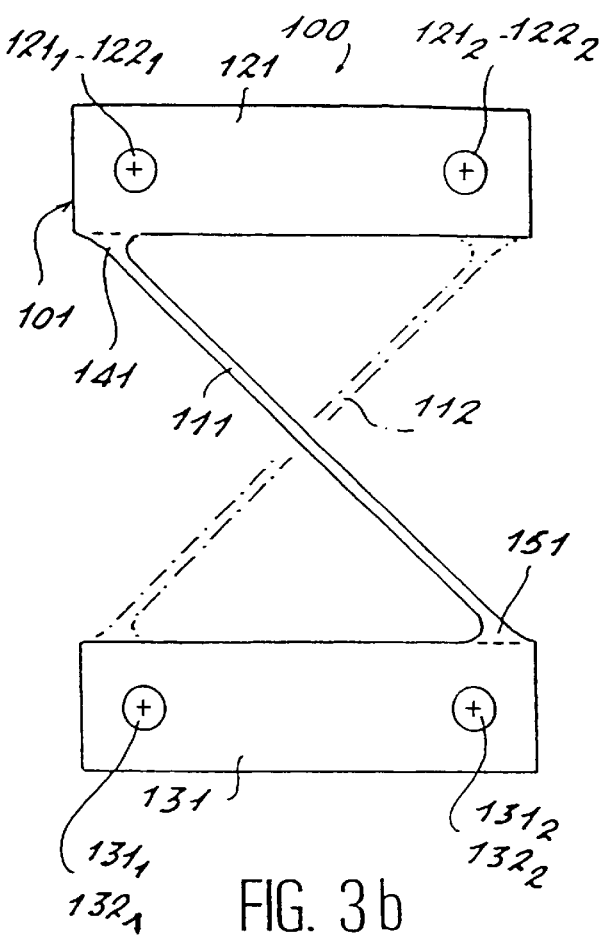

FIGS. 3a and 3b show a planar flexible pivot 100 consisting of an axial stack of two unitary modules 101, 102, each of these two unitary modules forming a monolithic unit comprising two coplanar rigid linking elements 121, 131 and 122, 132 respectively, positioned substantially so as to face each other and connected diagonally by an essentially rectilinear flexible band 111, 112 respectively.

To make the planar flexible pivot 100, the unitary modules 101, 102 are assembled by their respective linking elements 121, 131 and 122, 132 by bonding, soldering or anodic linkage. As the case may be, assembling holes $121_1$, $121_2$, $131_1$, $131_2$, $122_1$, $122_2$, $132_1$, $132_2$ could be provided in the linking elements.

As can be seen more particularly in FIG. 3b, the flexible bands such as the band 111 have, at each end, a transition area 141, 151 with a gradually variable section, forming a junction between the band 111 and the linking elements 121, 131. This arrangement prevents the concentration of high stresses and their transmission in the linking elements.

FIG. 3a shows that the flexible bands 111, 112 have a thickness reducing area 161, 162 between the two elements 121, 131 and 122, 132 so that the two neighboring bands such as 111 and 112 do not touch after stacking. It is also possible to prevent this drawback by means of thickness shims placed between the linking elements of two neighboring unitary modules.

FIG. 3b shows that the unitary modules 101, 102 of the planar flexible pivot 100 are joined so that the flexible band 111 of the unitary module 101 is crossed with the flexible band 112 of the neighboring unitary module 102. Thus, a cross-band planar pivot is made. In particular, said flexible bands 111, 112 are crossed at right angles.

The modules 101, 102 can be obtained in units by various methods of mass production such as the machining of metal wafers by wire electroerosion (steel, Al, Cu—Be), high-resistance (glass or carbon) fiber-reinforced plastic injection or again batch microlithography on a silicon wafer.

Figure 4:
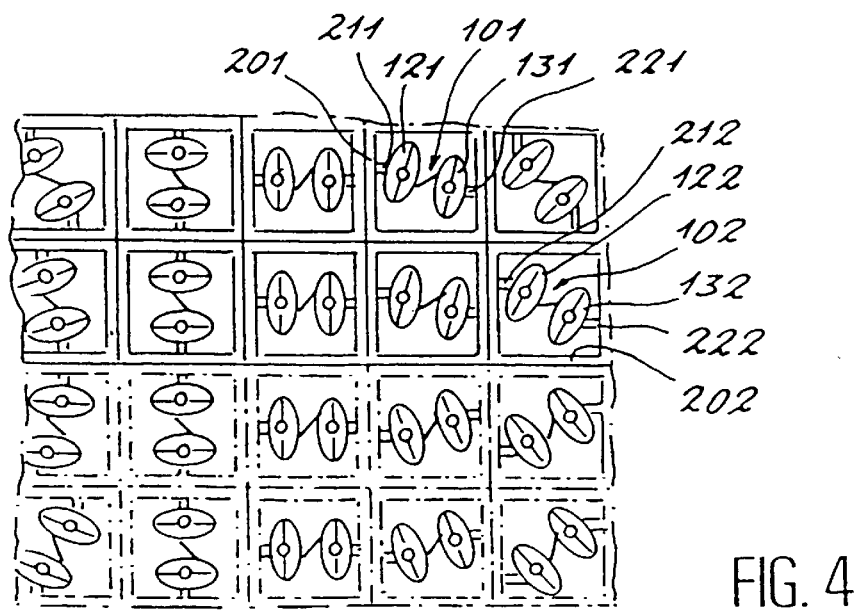
FIG. 4 is a top view of a wafer for the batch manufacture of the unitary modules of FIGS. 3a and 3b.

FIG. 4 gives a partial view of a silicon wafer on which unitary modules 101, 102 have been microetched. To facilitate the handling of these basic modules which remain brittle until they are assembled in a stack, it is planned to temporarily connect each linking element 121, 131 and 122, 132 to a carrier frame, respectively 201, 202, by fastening bridges 211, 221 and 212, 222. This temporary structure may also be used to position the modules during the assembly operation. Finally, the unitary modules are released by sawing through the fastening bridges.

Thus, the production of a batch of cross-band planar flexible pivots with two modules can be done in the following sequence:

the masking and cutting of the silicon wafer;
the separation of the frames by sawing;
the superimposition and anode linking of the modules in the crossed position;
the releasing of the fastening bridges by sawing.

It must also be noted that the thickness reduction areas of the flexible bands can be machined in series in the wafer before the cutting operation.

As mentioned further above, the planar flexible pivots proposed by the invention provide particularly advantageous possibilities to compensate for the effects of roundness defects or unbalance due to the shifting of the pivoting axis of the pivots during rotation.

FIG. 5a shows a first assembly, called a series assembly, of planar flexible pivots similar to that of FIGS. 3a and 3b, used to compensate for the lack-of-balance forces. This assembly comprises an internal interface 401 connected at each end to an external interface 402, 402' by means of an assembly 300, 300' of planar flexible pivots 100 arranged in series, each pivot 100 being constituted of two cross-band unitary modules 101, 102. In the example of FIG. 5a, the assemblies consist of two series-connected pivots 100 assembled by a spacer 301, 301' and by bonding.

The compensation obtained is highly efficient as can be seen in the graph of FIG. 5b which gives a view, in an X-Y reference system centered on a pivot, of the shift CMo of the physical center of rotation under very small deflections of a pivot (namely a physical point associated with small rotations) that is not compensated for a rotation θ, the shift CMo' of the physical center of rotation of the same pivot that is not compensated for a rotation θ/2 and the shift CM of the physical center of rotation of a pivot that is series-compensated for a rotation θ.

Although this assembly is slightly less rigid radially, has an axial offset D and includes an intermediate floating part, the planar structure makes it possible to maintain a very small intermediate mass and a very small axial offset.

The floating part and the axial offset of the series-compensation described here above may be avoided by the parallel-compensation assembly shown in FIGS. 6a, 6b and 6c.

In this assembly, a first structure S1, shown in FIG. 6a, has at least one planar flexible pivot 500 with two cross-band unitary modules, of which the first linking elements 501 form a first rigid interface and the second linking elements 502 form an intermediate recoil interface, which is connected to a second rigid interface 503 by an elastic parallelogram 504 orthogonal to the pivot 500.

FIG. 6b shows a second structure S2 identical to the first one but placed back-to-front with respect to the structure S1.

The two structures S1 and S2 are superimposed in this relative position to form the final assembly of FIG. 6c, the first rigid interfaces 501, 501' and second rigid interfaces 503, 503' being assembled with each other respectively while the intermediate interfaces 502, 502' remain free to recoil along the arrows R and R' that can be seen in FIG. 6c.

Thus, it can be shown that the only possible position for the physical center of rotation of the modified total interface 501 is located at the intersection of the two straight lines of recoil.

Figure 7:
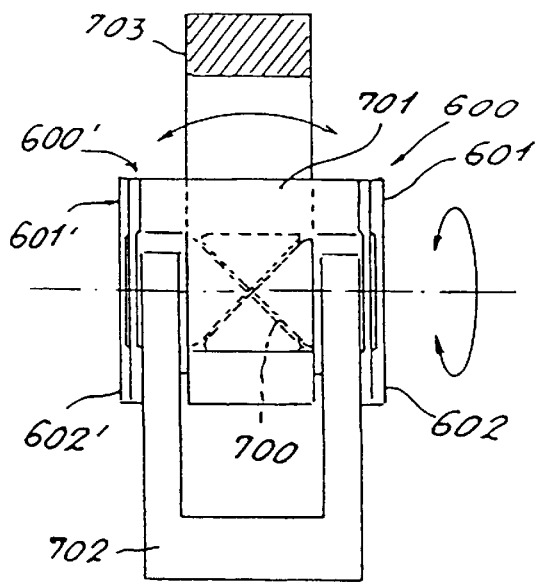
FIG. 7 is a partial front view of a cardan assembly obtained by means of planar pivots according to the invention.

FIG. 7 shows a first exemplary application of the cross-band planar flexible pivots according to the invention. This example which relates to a cardan assembly is built by means of a universal pivoting link assembly characterized by a central interface 701 that can be fitted into an external interface 702 and is mounted in a pivoting position with respect to said external interface 702 by means of two planar flexible pivots 600, 600' with two cross-band unitary modules, the linking elements 601, 601', 602, 602' of which are fixed respectively to the central interface 701 and the external interface 702.

To obtain the cardan assembly of FIG. 7 with two perpendicular pivoting axes, it is enough to complement the above universal assembly with at least one planar flexible pivot 700 with two cross-band unitary modules, that is orthogonal to the pivot 600, 600' and connects the central interface 701 to a second external interface 703.

Figure 8A:
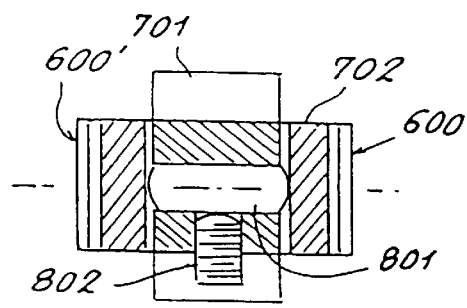
FIG. 8a is a partial top view of a contact stop pivoting link made by means of planar pivots according to the invention.
Figure 8B:
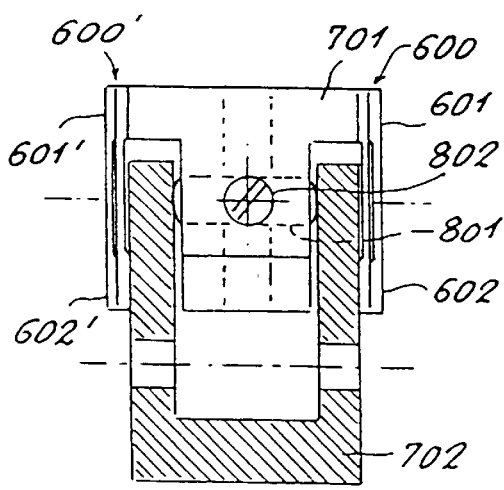

FIGS. 8a and 8b show a second application of the universal assembly described further above to the making of a contact stop pivoting link, wherein the central interface 701 has an adjustable axial contact stop 801 held by clamping screws 802.

Figure 9A:
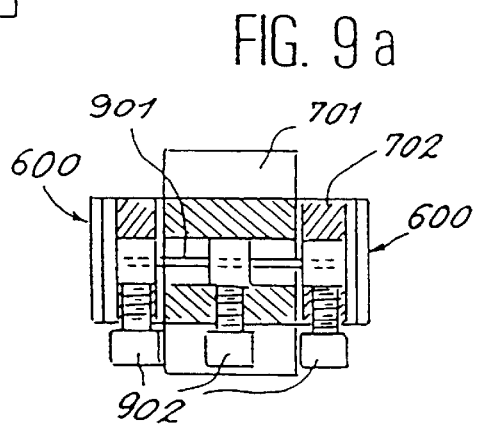
FIG. 9a is a top view of a torsion rod pivoting link made by means of planar pivots according to the invention.
Figure 9B:
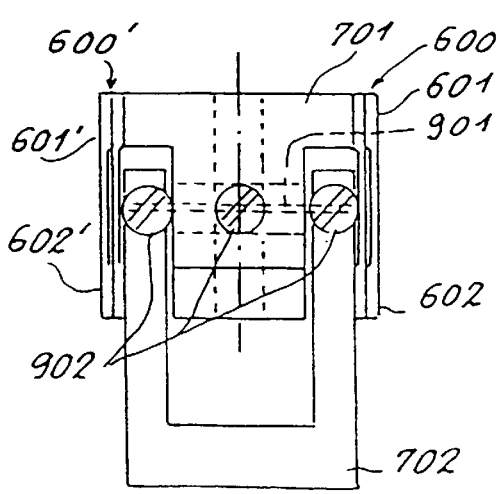

Similarly, FIGS. 9a and 9b give a third application of the universal assembly mentioned here above to the making of a torsion rod pivoting link according to which the central interface 701 has an adjustable axial torsion rod 901 and clamping screws 902.

Finally, in general, the limited-travel pivots may be advantageously fitted out with electrodynamic type actuators, the magnet and coil being each attached to one of the interfaces of the pivot.

Figure 10:
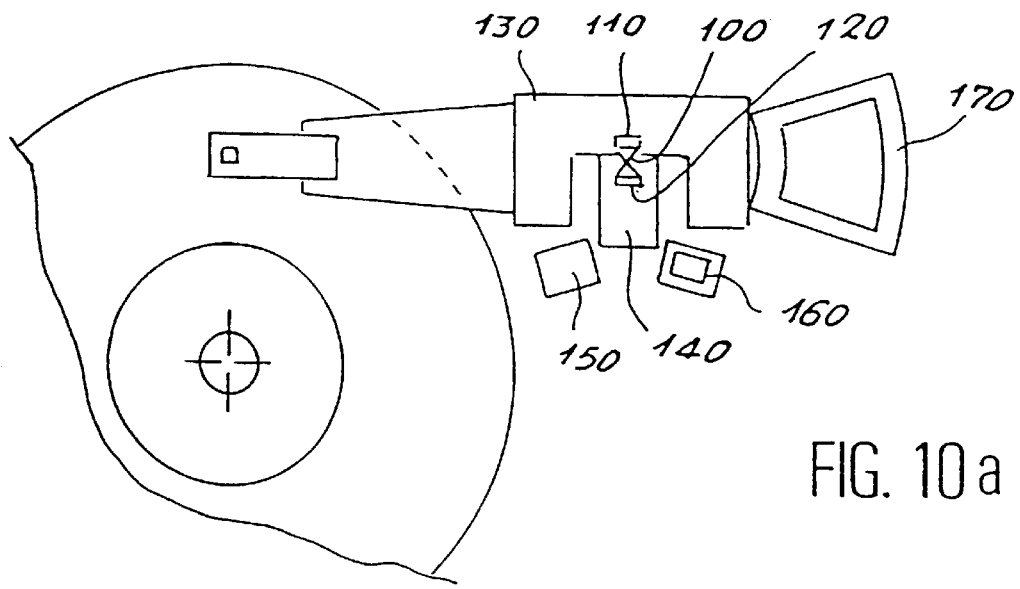
FIG. 10a is a top view of a read/write arm for a computer hard disk provided with planar flexible pivots according to the invention.
FIG. 10b is a top view of a stack of individually mobile arms provided with planar flexible pivots according to the invention.
FIG. 10c is a partial front view of the stack of arms of FIG. 10b.
Figure 10:
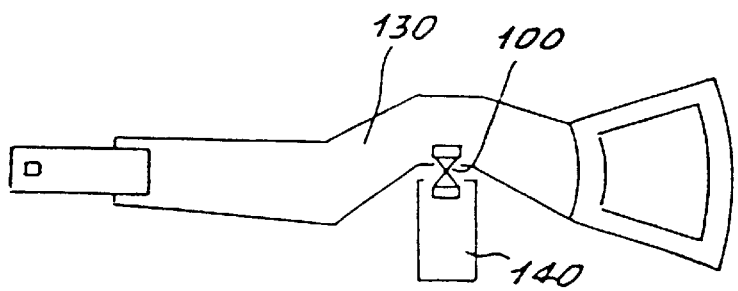
Figure 10:
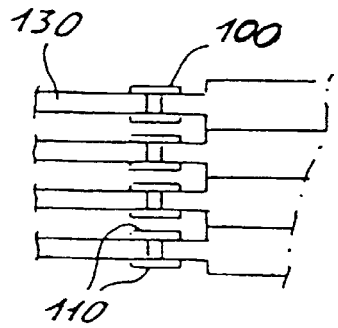

An integration of this kind can be made on planar flexible pivots for example for the setting up of light joints of assembly automatons or attitude control for minicamera observation systems. It is also possible, as shown in FIG. 10, to consider modifying the shape of the interfaces to adapt them to a particular application such as for example the read/write arm pivot of a computer hard disk. In the case of FIG. 10a, the arm 130 bearing the coil 170 is mounted so as to be pivoting on a mobile interface 110 of the cross-band pivot 100, the rotational travel of the arms being limited by the stop 150 and the stop 160 with a parking bolt. The second interface 120 of the pivot 100 is mounted on a fixed element 140.

At present, the arms of the multiple disks are stacked on a rigid block mounted on ball bearings. It is possible however to go further and envisage arms 130 individually oriented by means of planar flexible pivots 100 as can be seen in FIGS. 10b and 10c. It may be noted that the last-mentioned concept cannot be obtained with ball bearings.

Figure 11:
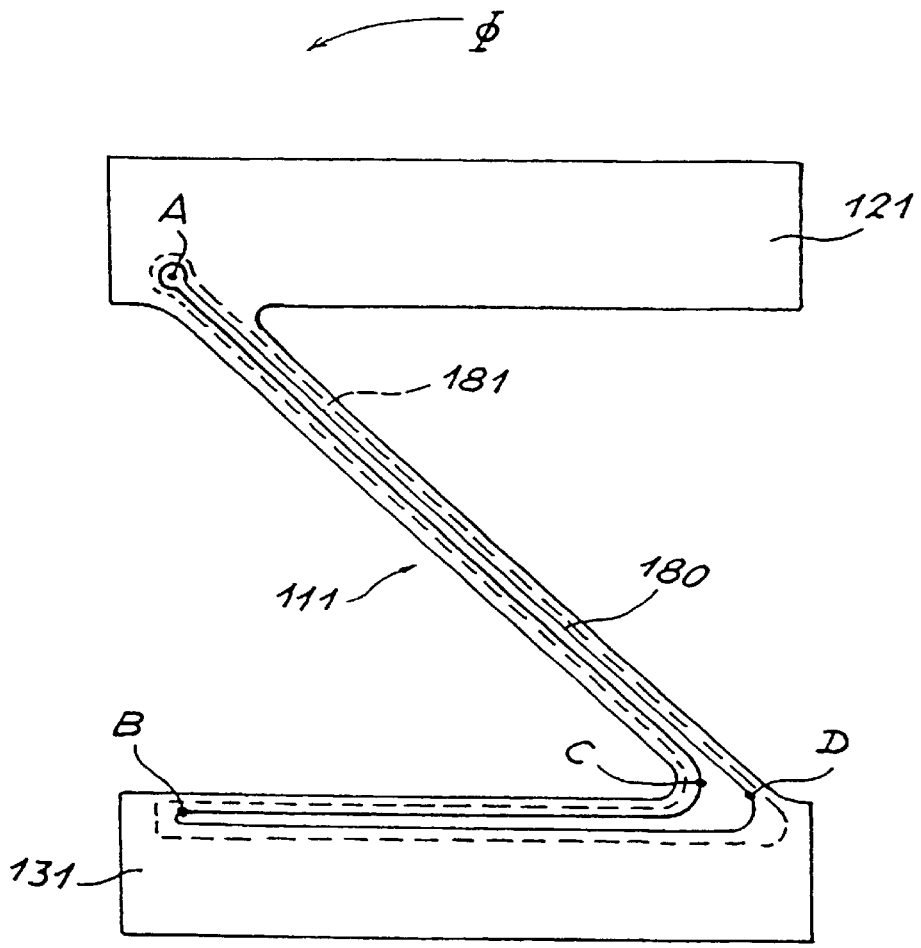
FIG. 11 is a front view of an integrated angular position sensor.

FIG. 11 is a front view of another application of the unitary module for a flexible pivot according to the invention to the making of an integrated angular position sensor. To this end, the flexible band 111 and one of the linking elements, for example the one referenced 131, are provided with a strip 180 following the resistive, piezoresistive or piezoelectrical type of closed loop line ACBD. This strip is fixed by means of an insulating layer 181. The strip 180 and the insulating layer 181 may be obtained by a deposition method or another method.

In the case of a resistive strip, following its deformation, the value of the resistance $R_{AD}$ between the points A and D is proportional to the angle of rotation $+\Phi$ while the value of the resistance $R_{AC}$ between the points A and C is proportional to the angle of rotation $-\Phi$. By contrast, the values of the resistances $R_{BC}$ between the points B and C and the resistance $R_{BD}$ between the points B and D are constant and may be used as comparison references to suppress the influence of the temperature.

Figure 12:
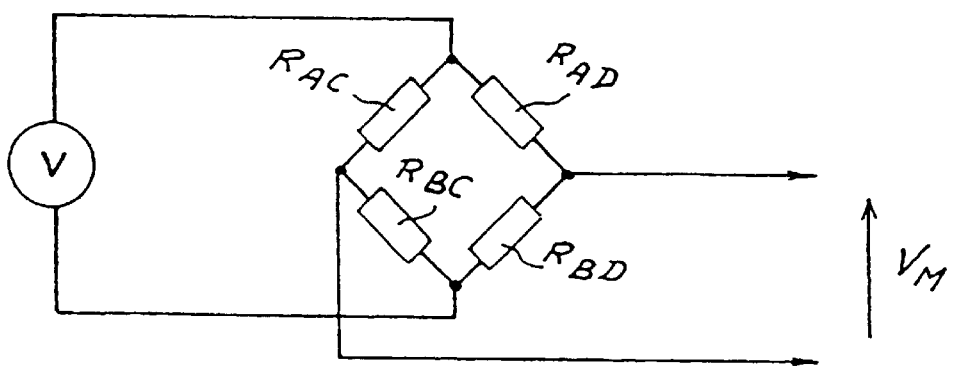
FIG. 12 is a diagram of a measuring circuit that can be used in the integrated angular position sensor of FIG. 11.

To measure the angle $\Phi$, a Wheatstone bridge type circuit is used according to the drawing of FIG. 12. The output voltage $V_M$ is a function of the angle of rotation $\Phi$.

Figure 13:
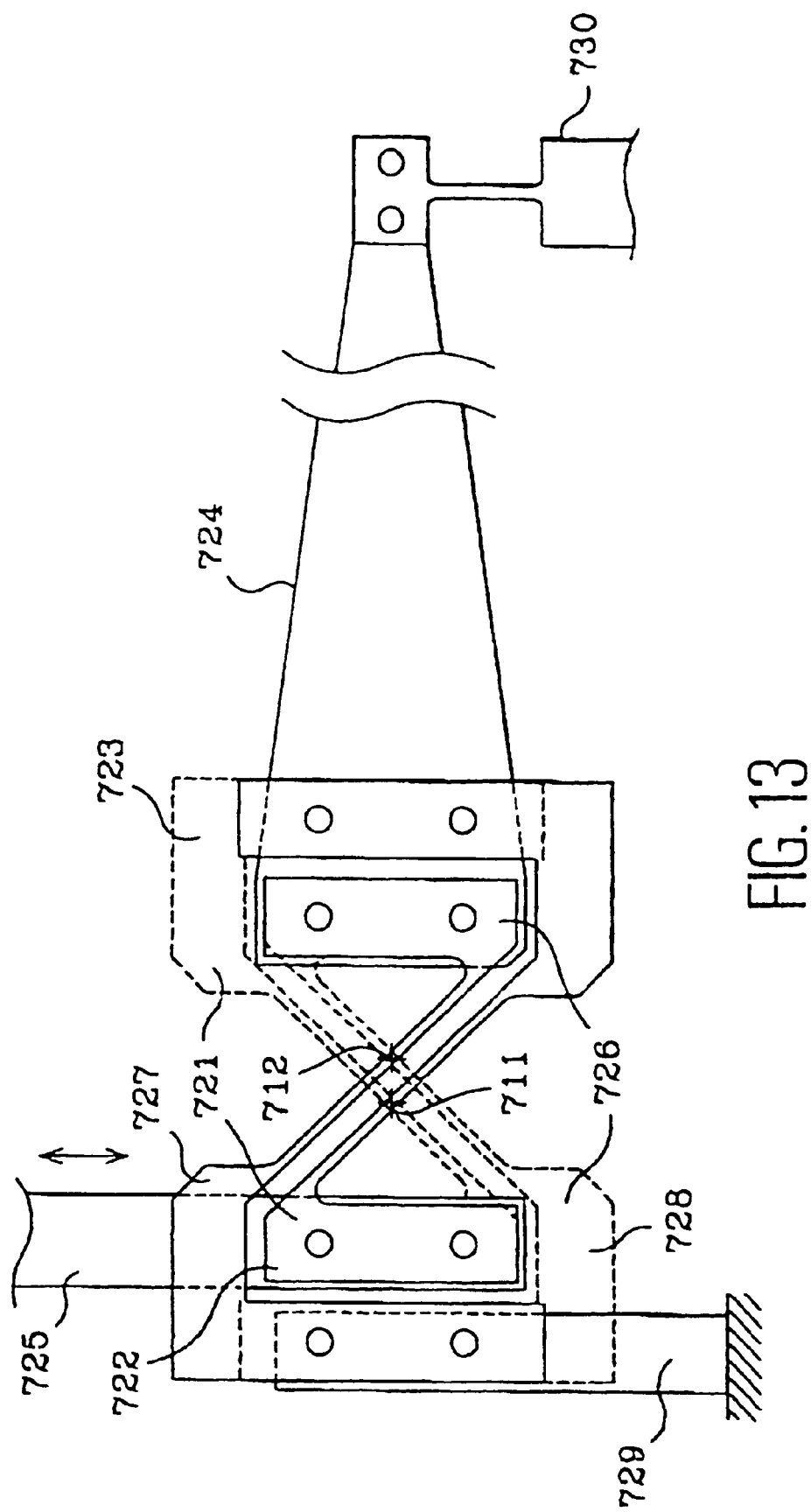
FIG. 13 is a diagram of an assembly comprising two interleaved pivots so as to present two offset rotational axes.

The assembly of the diagram of FIG. 13 comprises two pivots, similar to those described in relation with FIGS. 3a and 3b, which are interleaved so that their rotational points 711 and 712 are offset one respect to the other.

A first pivot 721 comprises a unitary module 722 and a unitary module 723 that are fixed, on the one hand, to a cantilever 724 and, on the other hand, to a mobile element.

A second pivot 726 comprises a unitary module 727 and a unitary module 728 that are fixed, on the one hand, to the cantilever 724 and, on the other hand, to a fixed base 729.

When the cantilever 724 is moved by the piezoelectric device 730, the double pivot moves the mobile element 725 on a distance which is smaller that the moving distance of the cantilever. The distance reduction factor depends upon of the length of the cantilever as well as of the offset rotational axes 711 and 712 of the two pivots.

The assembly of FIG. 13 operates both ways and a movement of the mobile element 725 leads to a movement of the cantilever.

What is claimed is:

1. A monolithic unitary module for a planar flexible pivot comprising:
    two coplanar rigid linking elements positioned in confronting spaced relation;
    a continuously solid generally rectilinear flexible band diagonally connected between the linking elements and suspended between endpoints thereof;
    wherein the flexible band has transition areas at a junction between the band and the linking elements, the transition area being of decreased thickness along the entire length of the band between junctions;
    wherein a plurality of unitary modules are axially stacked and connected to one another by their respective linking elements thereby forming a planar flexible pivot;
    an internal interface;
    two external interfaces located in spaced relation to ends of the internal interface;
    a pair of series connected modules, forming a flexible pivot, connected between confronting ends of one of the external interfaces and a corresponding end of the internal interface; and
    a second pair of series connected modules, forming a second flexible pivot, connected between confronting ends of the other external interface and an opposite corresponding end of the internal interface; and
    further wherein the flexible bands of each pair of modules are crossed in non-contacting relation with respect to one another.

2. A flexible pivot comprising stacked monolithic unitary modules, each module having:
    (a) two coplanar rigid linking elements positioned in parallel confronting spaced relation;
    (b) a continuously solid generally rectilinear flexible band diagonally connected between the linking elements and suspended between endpoints thereof;
    (c) the flexible band has transition areas at a junction between the band and the linking elements, the transition area being of decreased thickness along the entire length of the band between junctions;
    each linking element of each module being in direct contact with an adjoining linking element to form axially stacked modules.

3. The apparatus set forth in claim 2 together with two external components, each of which has a planar interface area for connection to a correspondingly positioned linking element of each axially stacked unitary module.

4. The apparatus set forth in claim 2 further comprising a plurality of planar flexible pivots; and
    means connected to the pivots for compensating for the effects of unbalance of roundness defects.

5. The apparatus set forth in claim 2 wherein the crossed flexible bands are oriented orthogonally.

6. The apparatus set forth in claim 3 wherein one of the two external components is a second planar flexible pivot.

7. The apparatus set forth in claim 2 wherein the flexible bands of adjacent axially stacked unitary modules are crossed with respect to one another to form at least one flexible pivot; and further wherein the apparatus comprises:
    a first planar structure including
        a) first linking elements forming a first rigid interface
        b) second linking elements forming an intermediate recoil interface;
        c) a second rigid interface;
        d) an elastic parallelogram shaped member connecting the second linking element to the second rigid interface;
    a second planar structure, identical to the first, and parallel stacked against the first planar structure in front-back relation; and
    the structures being connected together at their respective first and second rigid interfaces, the intermediate recoil interfaces remaining unattached.

8. The apparatus set forth in claim 2 further comprising:
    a central interface located within an external interface;
    at least one flexible band flexible pivot having two cross-band unitary modules;
    the linking elements of the modules respectively connected to the central interface and the external interface for allowing the central interface to pivot with respect to the external interface; wherein the apparatus serves as a universal pivoting link assembly.

9. The apparatus set forth in claim 8 wherein the central interface further comprises:

an additional flexible pivot having two cross-band unitary modules positioned orthogonal to the at least one flexible pivot and connecting the central interface with a second external interface, wherein the apparatus serves as a cardan joint.

10. The apparatus set forth in claim 8 wherein the central interface further comprises an adjustable contact stop held in place by a clamping screw, wherein the apparatus serves as a contact stop pivoting link.

11. The apparatus set forth in claim 8 wherein the central interface further comprises an adjustable axial torsion rod and at least one fastener for clamping the rod in place, wherein the apparatus serves as a torsion rod pivoting link.

12. The apparatus set forth in claim 3 wherein a first external component is a coil; and the second external component is a magnet;

the coil and magnet mounted for relative rotation with respect to each other, the apparatus serving as an electrodynamic actuator.

13. An assembly set forth in claim 12 further comprising a plurality of linearly displaced apparatus, each of which is connected to a disk arm thereby allowing each arm to pivot independently of others.

14. The apparatus set forth in claim 2 further comprising:

a resistive, piezoelectric strip mounted in the flexible band and the linking elements and forming a loop (ABCD) therein;

whereby the resistance measured between point A and points C and D vary according to the angle of rotation of the flexible band while the resistance between point B and points C and D remains constant thus constituting a thermal reference; and a circuit connected to at least points A, C and D for measuring the values of variable resistance.

15. The apparatus set forth in claim 5 wherein an assembly of two flexible pivots are interleaved to maintain rotational axes that are offset relative to each other;

a first of the two flexible pivots having first and second unitary modules each connected between a cantilever and a mobile element;

a second of the two flexible pivots having first and second unitary modules each connected between the cantilever and a fixed base.

16. The apparatus set forth in claim 11 further comprising a piezoelectric device connected to the cantilever.

* * * * *